(12) United States Patent
Alcock

(10) Patent No.: US 6,796,720 B2
(45) Date of Patent: Sep. 28, 2004

(54) OPTICAL COMPONENT

(75) Inventor: Ian Peter Alcock, Alyesbury (GB)

(73) Assignee: Point Source Limited (GB)

( * ) Notice: Subject to any disclaimer, the term of this patent is extended or adjusted under 35 U.S.C. 154(b) by 24 days.

(21) Appl. No.: 10/139,762

(22) Filed: May 7, 2002

(65) Prior Publication Data

US 2002/0181891 A1 Dec. 5, 2002

(30) Foreign Application Priority Data

May 9, 2001 (GB) .............................................. 0111363

(51) Int. Cl.[7] .................................................. G02B 6/36
(52) U.S. Cl. ...................................................... 385/79
(58) Field of Search ............................. 385/76–79, 93, 385/88–92

(56) References Cited

U.S. PATENT DOCUMENTS

| | | |
|---|---|---|
| 4,060,309 A | 11/1977 | Le Noane et al. |
| 4,193,664 A | 3/1980 | Ellwood |
| 4,451,115 A | 5/1984 | Nicia et al. |
| 4,776,663 A * | 10/1988 | Malinge et al. ................ 385/79 |
| 4,889,406 A | 12/1989 | Sezerman |
| 5,185,834 A | 2/1993 | Day et al. |
| 5,668,899 A | 9/1997 | Jadrich |
| 5,812,258 A | 9/1998 | Pierson |

FOREIGN PATENT DOCUMENTS

| | | |
|---|---|---|
| DE | 3323653 A1 | 5/1983 |
| EP | 0 682 280 A1 | 11/1995 |
| GB | 1 508 138 | 4/1978 |
| GB | 1 569 615 | 6/1980 |
| JP | 9-329727 | 12/1997 |

\* cited by examiner

*Primary Examiner*—Khiem Nguyen
(74) *Attorney, Agent, or Firm*—Karen Lee Orzechowski; IP Law Specialists, llc

(57) ABSTRACT

An optical component 1 comprises a holder 2 formed as a generally elongate tubular member which, at one end, houses a lens 3 and, at the other end, houses an optical fiber 4. The optical fiber 4 is fixed within an elongate tubular ferrule 5. The optical component 1 further includes three adjustment screws 10 which can engage the front of the ferrule 5. The adjustment screws 10 can be used to adjust the radial positioning of the end of the optical fiber 4 and to tilt the ferrule 5 (and thus the fiber 4) with respect to the holder 2 about a pivot point defined by a neck 9 in the holder 2.

29 Claims, 3 Drawing Sheets

OPTICAL COMPONENT

Figure 1:
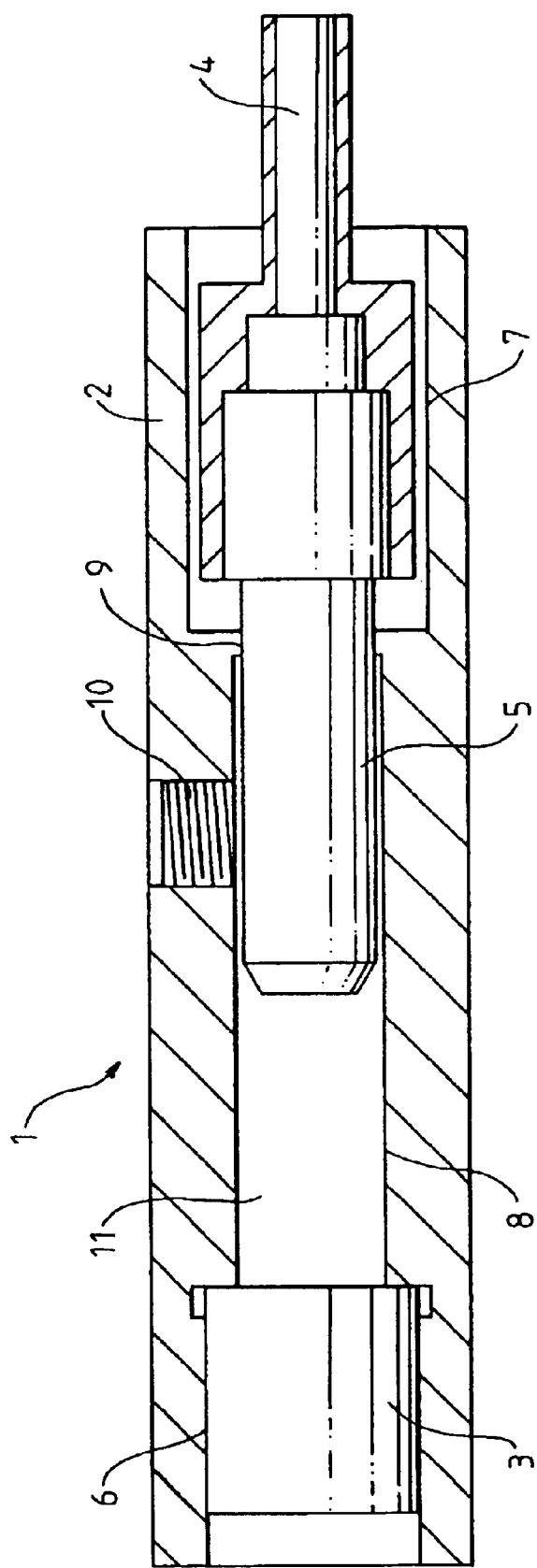

The present invention relates to the coupling of electromagnetic, particularly laser, radiation into and out of optical fibres and other optical devices. More particularly, it relates to optical components of the type comprising a lens mounted at an end of an optical fibre for coupling the radiation into and out of the optical fibre.

In many applications electromagnetic, particularly laser, radiation is transmitted using an optical fibre and must therefore enter the fibre at one end and exit the fibre at the other end. There is therefore a need to couple the electromagnetic radiation into and out of the fibre, to allow the radiation to, for example, be transferred into or out of the optical fibre from or into, for example, a second optical fibre or other optical equipment such as a laser.

One problem with coupling radiation into and out of an optical fibre is that it is necessary to align the incident radiation with the end of the optical fibre with a high degree of accuracy in order to minimise energy losses. However, this accurate alignment can be difficult to achieve since, due to the small diameter of optical fibres, small errors in the positioning of the end of the optical fibre relative to the incident radiation can result in large energy losses during transmission.

To alleviate this problem it is known to use a lens to focus the incident radiation beam onto the end of the optical fibre. The lens effectively focuses the radiation onto the fibre end, and, conversely, collimates or focuses radiation exiting the fibre. The lens, in effect, magnifies the end of the optical fibre, thereby increasing its effective size and making alignment of the radiation and the end of the optical fibre easier. Such an arrangement is often referred to as an "expanded beam" arrangement.

The positioning of the lens relative to the fibre end in these arrangements is, as will be appreciated from the above, important. For example, both the axial distance between the lens and fibre, and the radial distance between the lens and fibre may need to be set accurately.

The relative positioning of the lens and fibre could be adjusted in use, by providing a suitably adjustable holder for the lens and fibre. However, the adjustments can be relatively complex and time-consuming, and it may not therefore be desirable to always have to perform them in use, particularly where frequent changes or disconnection and reconnection, etc., of optical fibres in use is required.

It is known therefore to provide optical components comprising a lens and optical fibre held in a fixed, pre-aligned relationship in a holder, typically a cylindrical tube, so as to avoid the need to repeatedly adjust the relative positions of the lens and fibre in use. These devices are typically known as lens "tubes" or lens "barrels".

The lens tube holds the lens and optical fibre end in a fixed alignment, therefore avoiding the need to further adjust the relative positions of those components in use. The lens tube can thus be inserted in an optical connector for, for example, optically coupling the fibre to another fibre. The connector in this situation would usually be provided with means to adjust the position and orientation of the two lens tubes so that they can be accurately aligned with respect to each other, but there is no need to otherwise adjust the positions of the individual lenses and fibres.

It will be appreciated that it is necessary to ensure appropriate alignment between the lens and optical fibre in the lens tube, so as to, for example, reduce energy losses from any misalignment of the lens with respect to the end of the optical fibre. It can in particular be important to ensure correct alignment between the optical axis of the fibre and the optical axis of the lens, and the relative tilt between these axes.

There is therefore a need to manufacture lens tubes in which the lens and the optical fibre are aligned with a high degree of accuracy. Many known lens tubes address this by providing means within the lens tube to adjust the position and orientation of the lens within the lens tube during manufacture of the lens tube so that accurate alignment of the lens and optical fibre can be achieved. Such a conventional lens adjustment mechanism typically comprises a series of adjustment screws spaced circumferentially around the lens to allow adjustment of the position of the lens until accurate alignment is achieved.

However, the Applicants have recognised that with this known method of manufacturing lens tubes in which the position of the lens is adjusted, the size of the lens tube is constrained by the need to accommodate the lens adjustment mechanisms.

From a first aspect therefore, the present invention provides a method of constructing an optical component, the method comprising providing a holder having a throughbore, mounting a lens within the throughbore in a fixed relationship with respect to the holder, inserting an optical fibre into the throughbore, and adjusting the position of the optical fibre within the throughbore to align the optical fibre with respect to the lens.

In the present invention, when the lens "tube" is constructed, rather than adjusting the position of the lens to align the lens and optical fibre, it is the optical fibre that is adjusted, with the lens being held in a fixed position.

By adjusting the optical fibre, as opposed to the lens, a less bulky adjustment mechanism is required, as the optical fibre has a much smaller diameter than the lens. In this way, the present invention allows for a more compact construction of lens tube when compared to known lens tubes. This can reduce manufacturing costs and also allows for less bulky construction of devices and systems that use the lens tube, such as the optical connectors referred to above.

The present invention also extends to an optical component (lens "tube") constructed in accordance with the present invention and thus from a further aspect, the present invention provides an optical component comprising a holder having a throughbore, a lens mounted in the throughbore in a fixed relationship with respect to the holder, an optical fibre mounted in the throughbore, and adjustment means for adjusting the position of the optical fibre within the throughbore to align the optical fibre with respect to the lens.

The type of lens used in the present invention is not critical and so any suitable form of lens may be used. It may, for example, be a standard lens as used in conventional lens tubes. Unlike in conventional lens tubes, however, during manufacture the lens is immediately fixed in position relative to the holder. This may be done by any suitable means. For example, one end of the throughbore can be sized to snugly receive the lens which may then be glued in place thus providing a permanently fixed relationship between the lens and the holder.

The type of optical fibre used with the present invention is again not critical. The optical fibre may therefore take any suitable form and may be of a known type.

The optical fibre should be adjusted appropriately to ensure suitable alignment with the lens (and preferably with the longitudinal and/or mechanical axis of the throughbore and/or of the holder). Thus preferably the axial distance between the lens and fibre end is or can be adjusted. The radial alignment between the lens and fibre is also or instead preferably adjustable, as is the relative tilt between the optical axis of the fibre and the optical axis of the lens (and/or the mechanical or longitudinal axis of the throughbore and/or holder). It is also preferably possible to be able to adjust the lateral alignment of the fibre with respect to the lens.

Most preferably, the fibre is able to be moved axially within the throughbore. This can help, for example, to achieve the desired focus with the lens. In another preferred embodiment, the fibre is able to be moved radially within the throughbore (with the holder's adjustment means therefore being capable of moving the fibre radially within the throughbore). Most preferably the fibre can be moved both radially and axially, as that allows the probable necessary adjustments to be carried out relatively straightforwardly.

Axial adjustment of the fibre may be carried out using any suitable means. For example, during construction of the optical component, a translation stage located exterior of the optical component may be used to adjust the axial positioning of the fibre. Suitable translation stages are known in the art. Other types of fibre manipulator may also be suitable for this purpose.

In a particularly preferred embodiment, the fibre can also or instead be tilted about a pivot point, as this allows the angular alignment (tilt) of the fibre relative to the optical axis of the lens, the mechanical axis of the holder, etc. to be adjusted, and thereby any angular error to be reduced. Such tilting can be achieved by moving the end of the fibre radially relative to a radially fixed pivot point at a position along the length of the fibre within the throughbore.

The adjustment means is preferably mounted on the holder so that it is an integral part of the optical component. Preferably, once the fibre has been accurately aligned, the adjustment means can be fixed, e.g. by gluing, to maintain this alignment. The adjustment means can take any suitable form, and be any suitable adjustor, such as adjustment screws (e.g. grub screws), piezo-electric actuators, solenoids, linear actuators, etc. Where appropriate, once the fibre has been aligned the adjustors could be removed after fixing the fibre in place.

To facilitate its adjustment, the end of the optical fibre is preferably mounted in a ferrule, which preferably can be moved axially within the throughbore. Using a ferrule provides well defined datum surfaces which allow the end of the optical fibre to be manoeuvred more easily. The ferrule may take any suitable form but preferably comprises an elongate tubular member inside of which one end of the optical fibre is fixed.

The radial adjustment of the fibre can be carried out as desired. However, it is preferably carried out by means of radially extending adjustment means, such as screws, which are mounted on the holder and extend into the throughbore and can thereby engage the fibre or ferrule if provided. This is a convenient way of carrying out the radial adjustment.

The adjustment of the fibre's position should be possible from the exterior of the holder, so the adjustment means should be accessible from the exterior of the holder.

The correct positioning of the fibre end with respect to the fixed lens may be judged by any suitable criteria. For example, a test beam of electromagnetic radiation may be passed along the optical fibre and the adjustment screws adjusted to obtain a desired strength of beam exiting the optical component. The fibre may be adjusted, for example, to maximise the strength of the beam of radiation exiting the optical component although, as stated above, other criteria may be used in assessing the correct adjustment of the fibre with respect to the lens.

Once the position of the fibre relative to the lens has been adjusted, the fibre is preferably fixed in place such that no further adjustment is possible. This can be done, e.g., by gluing the fibre and/or adjustment means such as screws (where provided) in place. Permanently fixing the fibre's position once it is adjusted, avoids the risk or need of further adjustment of the fibre in use being required.

The holder which houses the lens and the end of the optical fibre may take any suitable form. Preferably, as with known lens tubes, it comprises an elongate cylindrical element through which a throughbore is formed.

The throughbore defined by the holder is preferably circular in cross section although other shapes of cross section may also be suitable.

Preferably, the throughbore comprises a front portion formed at one end of the holder which receives the lens. This front portion is preferably sized to snugly receive the lens which may then be glued in place to fix the lens in relation to the holder. Preferably the throughbore additionally comprises a rear portion formed at the other end of the holder into which the end of the optical fibre can be inserted during manufacture and from which the optical fibre extends during use.

Between the front portion and the rear portion, the throughbore preferably includes a centre portion. This centre portion preferably receives the front end of the fibre (and of the ferrule carrying the fibre, if any, the rear of the ferrule remaining within the rear portion of the throughbore). The rear portion is preferably sized to allow insertion of the fibre or ferrule during construction and, where appropriate, to accommodate the rear of the ferrule during use. The diameter of the centre portion of the throughbore preferably closely corresponds to the diameter of the front end of the fibre or ferrule as appropriate. A slight gap is preferably provided, however, between the circumferential surface of the front portion of the ferrule or fibre and the circumferential surface of the centre portion of the throughbore so that a limited degree of radial movement of the ferrule (if any) and fibre within the centre portion is permitted. The ferrule (if any) and fibre should also be adjustable axially within the throughbore. The correct axial positioning of the fibre may be achieved for example by axially adjusting the fibre end using a translation stage or other manipulator.

The radial adjustment of the fibre may take any suitable form which allows radial positioning of the end of the optical fibre. Preferably the radial adjustment is carried out by one or more radially extending adjustment means, such as adjustment screws (or other adjustors, as discussed above). These radial adjustment means are preferably located towards or at the expected axial position of the front end of the fibre in use in the holder. This will typically be at or around the longitudinal centre of the holder and in the centre portion of the throughbore (although this is not essential). Preferably the holder is formed with radially extending threaded bores for each adjustment screw, with each bore extending from the exterior of the holder to the throughbore thus allowing adjustment of the adjustment screws from the exterior of the lens tube, say using a conventional screwdriver. Preferably the adjustment screws comprise screws such as grub screws which do not extend outside of the profile of the holder. In a preferred form, three radial adjustment means, e.g. screws, are provided which are equally spaced around the circumference of the holder, i.e. there is an angle of approximately 120° between each. In this way, the end of the optical fibre can be moved radially in any desired direction within the limits defined by the gap between the fibre or ferrule (if any) and the centre portion of the throughbore.

As discussed above, it is preferred to be able to tilt the fibre within the holder. This can be achieved, for example, by pivoting the fibre by adjusting the radial position of its end relative to another part of the fibre. Thus, the throughbore is preferably formed with a pivot, preferably in the form of a narrower neck within the throughbore, which is spaced apart from the radial adjustment means. The pivot point is, where appropriate, preferably located between the rear portion, which accommodates the rear of the ferrule, and the centre portion, which accommodates the front of the ferrule in the throughbore.

The pivot point (neck) is preferably sized to snugly fit around the outer surface of the ferrule or fibre and is thus of a diameter less than the diameter of the rest of the (centre portion of) the throughbore. The pivot point (neck) preferably only extends for a short axial distance along the throughbore, such that it will restrain lateral movement of the portion of the ferrule or fibre engaged by the pivot point (neck), but the fibre or ferrule is still able to tilt relative to the holder about the pivot point (neck) within the limits dictated by the gap otherwise between the fibre or ferrule and the inside of the throughbore. The facility to pivot the fibre in this way allows the position of the end of the optical fibre to be adjusted.

It will be appreciated that the longitudinal (axial) distance between the adjustment means and the pivot will affect the sensitivity of the adjustment of the optical fibre. Furthermore, the relative positions of the adjustment means and the pivot with respect to the fibre end will also affect the sensitivity of the adjustment. For example, if, as in the examples above, the (radial) adjustment means are arranged closer to the front (output) end of the fibre than the pivot point, then any movement of the adjustment means will have a greater relative effect on the position of the end of the fibre than an arrangement where the pivot point is nearer to the output (front) end of the fibre than the adjustment means (which arrangement creates a lever action that will reduce the movement of the fibre end for a given movement of the adjustment means (i.e. "demagnify" the movement of the adjustment means) and therefore increase the sensitivity of the movement). In both these cases, the sensitivity of the movement will increase, the greater the axial (longitudinal) spacing of the adjustment means and pivot, with the greatest sensitivity being when they are as far apart as possible.

Thus, in one preferred embodiment, the adjustment means are closer to the front (output) end of the fibre (and the lens) than the pivot, and in another preferred embodiment, the pivot is closer to the front (output) end of the fibre (and the lens) than the adjustment means.

In another preferred embodiment two sets of longitudinally (axially) spaced adjustment means are provided for adjusting the position of the fibre in the throughbore. This allows greater scope for adjustment of the fibre's position (e.g. in terms of both lateral and angular alignment), and, for example, facilitates using one set of adjustment means as a pivot, whilst tilting the fibre with the other set of adjustment means.

The lens, holder, ferrule, and adjustment means may be manufactured from any suitable material which provides sufficient strength and durability.

It can be seen from the above that a preferred embodiment of the method of the present invention comprises fixing a lens in one end of the holder's throughbore, inserting the end of an optical fibre, preferably firstly into a ferrule (into which it is fixed), into the other end of the throughbore, positioning the fibre axially within the throughbore, adjusting the radial position of the fibre within the throughbore, and fixing the fibre in position in the throughbore.

Although the present invention has been described with particular reference to a system in which the lens is fixed in place and only the optical fibre's position is adjusted, the Applicants have recognised that in some cases it may still be desirable to be able to adjust the position of both the fibre and lens. In that case, the optical component ("lens tube") would include adjustment means for the lens as well as for the optical fibre.

Thus, according to another aspect of the present invention, there is provided a method of constructing an optical component, the method comprising: providing a holder having a throughbore, mounting a lens within the throughbore, inserting an optical fibre into the throughbore, and adjusting the position of the optical fibre within the throughbore to align the optical fibre with respect to the lens.

According to a yet further aspect of the present invention, there is provided an optical component comprising a holder having a throughbore, a lens mounted in the throughbore, an optical fibre mounted in the throughbore, and adjustment means for adjusting the position of the optical fibre within the throughbore to align the optical fibre with respect to the lens.

In these embodiments of the invention, the lens could simply be mounted within the throughbore in a fixed relationship with respect to the holder, as in the earlier aspects and embodiments of the invention. Alternatively, adjustment means for adjusting the position of the lens could be provided, with the lens's position being adjusted as well as the fibre's position (with the lens then being fixed in place once the adjustment is completed, if desired).

These aspects and embodiments of the invention can include any one or more or all of the preferred features of the invention discussed above.

A number of preferred embodiments of the present invention will now be described, by way of example only, and with reference to the accompanying drawings, in which:

FIG. 1 shows a first embodiment of an optical component in accordance with the present invention; and FIGS. 2, 3, 4, and 5 show further embodiments of optical components in accordance with the present invention.

Like reference numerals are used for like components throughout the drawings.

Figure illustrates a first embodiment of an optical component 1, commonly referred to as a lens "tube", in accordance with the present invention. The optical component 1 comprises a holder 2 formed as a generally elongate tubular member which, at one end, houses a lens 3 and, at the other end, houses an optical fibre 4.

The holder 2 defines a throughbore 11. The throughbore 11 is circular in cross section and extends from an aperture at a first end of the holder 2 to an aperture at a second end of the holder 2. Adjacent to the first end of the holder 2 the throughbore 11 comprises a front portion 6 sized to receive the lens 3. The lens 3 is also of circular cross section and is inserted into the front portion 6 of the throughbore 11 and fixed in place, say by gluing.

Before the end of the optical fibre 4 is inserted into optical component 1 it is first fixed within an elongate tubular ferrule 5. The provision of ferrule 5 assists in the accurate adjustment of the end of the optical fibre 4 since it defines surfaces which have a known, fixed relationship with respect to the end of the optical fibre 4 and which can in turn be accurately manoeuvred.

The throughbore 11 is formed with a rear portion 7 adjacent to the second end of the holder 2. Between the front and rear portions, the throughbore 11 comprises a centre portion 8 which extends for the remaining length of the holder 2. The ferrule 5 is inserted into the holder 2 through the rear portion 7 of the throughbore 11 so that the front of the ferrule 5 is received in the centre portion 8 of the throughbore 11 and the rear of the ferrule 5 is received in the rear portion 7 of the throughbore 11. The rear portion 7 is sized to accommodate the protective cladding which extends over the rear of the ferrule 5 while the centre portion 8 has a diameter which generally conforms to the diameter of the front of the ferrule 5. A slight gap, however, is provided between the outer surface of the ferrule 5 and the inner surface of the centre portion 8 of the throughbore 11. This gap allows a degree of radial movement of the ferrule 5 within the centre portion 8 of the throughbore 11, which movement is required to allow the radial position of the end of the optical fibre 4 to be adjusted.

The throughbore 11 includes a neck 9 formed between the rear portion 7 and centre portion 8 of the throughbore. The neck 9 is sized to correspond more closely to the outer diameter of the ferrule 5 and thus has a diameter slightly less that the diameter of the remaining part of the centre portion 8 of the throughbore 11. With the front of the ferrule 5 located in the centre portion 8 of the throughbore and the rear of the ferrule 5 located in the rear portion 7 of the throughbore 11, the neck 9 engages the ferrule 5 at a point approximately half way along its length. At the point where the neck 9 engages the ferrule 5, lateral movement of the ferrule 5 away from the longitudinal axis of the throughbore 11 is restrained by the neck 9. However, since the centre portion 8 of the throughbore is sized to allow a limited degree of movement of the front of the ferrule 5, the ferrule 5 is able to tilt relative to the holder 2 with the neck 9 acting as a pivot.

The adjustment means of the optical component 1 comprises three adjustment screws 10 each located in a radial threaded bore which extends from the centre portion 8 of the throughbore to the exterior of the holder 2. The adjustment screws 10 comprise grub screws and are located at the same axial position along the length of the holder 2 but are spaced around the circumference of the holder 2. The adjustment screws 10 are equally spaced about this circumference, i.e. there is an angle of 120° between each adjustment screw 10. (As discussed above, other forms of adjustor can be used, if desired.)

The adjustment screws 10 of the adjusting means are located approximately half way along the length of the holder 2 and extend from the radial bores into the centre portion 8 of the throughbore 11 to engage the front of the ferrule 5. The adjustment screws 10 engage the front of the ferrule 5 at a location spaced from the necked portion 9 of the throughbore. Thus adjustment of the grub screws 10 within their respective bores allows the ferrule 5 to be tilted about the neck portion 9.

In manufacture of the optical component 1, the lens 3 is inserted into the front portion 6 of the throughbore 11 formed through the holder 2 and fixed in place with respect to the holder 2, say by gluing. The end of the optical fibre 4 is inserted into the ferrule 5 (if provided) and, again, fixed in place in the ferrule, say by gluing. The ferrule 5 is then introduced into the rear portion 7 of the throughbore 11 and axially positioned within the throughbore, say by adjustment of the fibre using a translator stage, to obtain the correct axial spacing between the lens 3 and the end of the optical fibre 4. The arrangement is preferably such that with the ferrule 5 axially positioned, approximately half of its length lies within the rear portion of the throughbore and the remainder extends into the centre portion 8 of the throughbore 11. In this position, the neck 9 formed between the centre and rear portions of the throughbore 11 engages the ferrule 5 approximately halfway along its length and the adjustment screws 10 are located towards the end of the optical fibre 4 and ferrule 5.

Adjustment of the radial positioning of the end of the optical fibre 4 is then achieved by adjustment of the adjustment screws 10 which engage the front of the ferrule 5 and tilt the ferrule 5 (and thus the fibre 4) with respect to the holder 2 about the pivot point defined by the neck 9. The adjustment screws 10 may be adjusted from the exterior of the holder 2, say using a screwdriver, and the provision of three adjustment screws 10 spaced equally around the circumference of the holder 2 allows radial adjustment of the end of the ferrule 5, and hence the end of the optical fibre 4, in any radial direction.

A test beam of electromagnetic radiation, particularly laser radiation, is passed along the optical fibre 4 and the adjustment screws 10 are adjusted until the desired strength of beam exiting the optical component 1 is obtained indicating that the lens 3 and optical fibre 4 are accurately aligned. Once this has been done, the adjustment screws 10 are fixed in place, say by gluing, to maintain the accurate alignment of the lens 3 and optical fibre 4. The optical component 1 is then ready for use.

Figure 2:
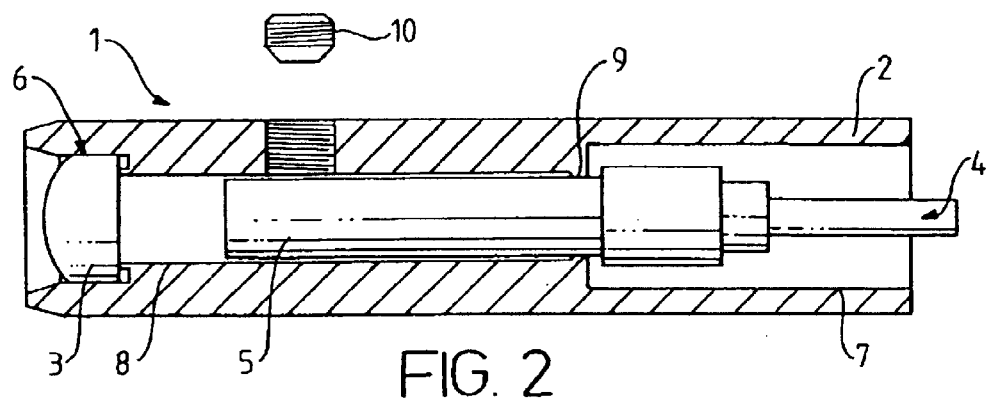

FIG. 2 shows a second preferred embodiment of the present invention that is similar to the first embodiment. In this embodiment the adjustment means 10 is again arranged at the output end of the fibre 4 with the pivot 9 is spaced from it and positioned closer to the rear end of the holder 2 (and ferrule 5). However, the adjustment means 10 and pivot 9 are spaced further apart than in the first embodiment.

Figure 3:
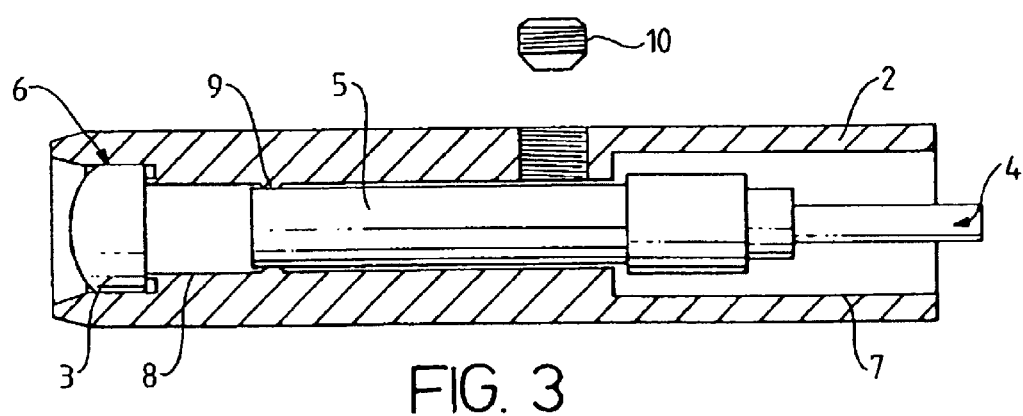

FIG. 3 shows a third preferred embodiment in which, in contrast to the first and second embodiments, the pivot point 9 is closer to the front (output) end of the optical fibre 4 (and ferrule 5) than the adjustment means 10. This arrangement has the effect of reducing the movement of the output end of the fibre for a given amount of movement of the adjustment means (by means of the lever action set up), and so can provide increased adjustment sensitivity.

Figure 4:
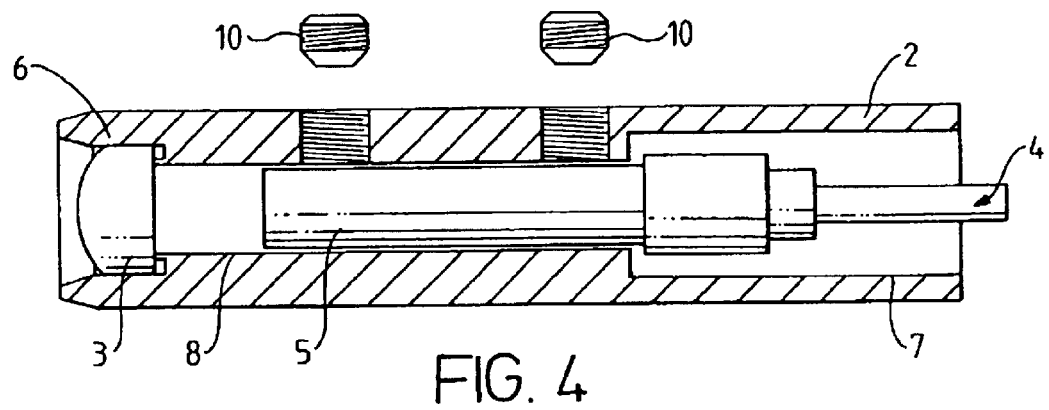

FIG. 4 shows an embodiment in which there are two linearly spaced sets of adjustment means 10 that can engage the fibre 4. This arrangement allows a wider range of adjustments to be made, such as both linear radial motion and tilting of the fibre. There is no need for a separate pivot point such as a neck in this arrangement, as one set of adjustment means 10 can act as a suitable pivot.

Figure 5:
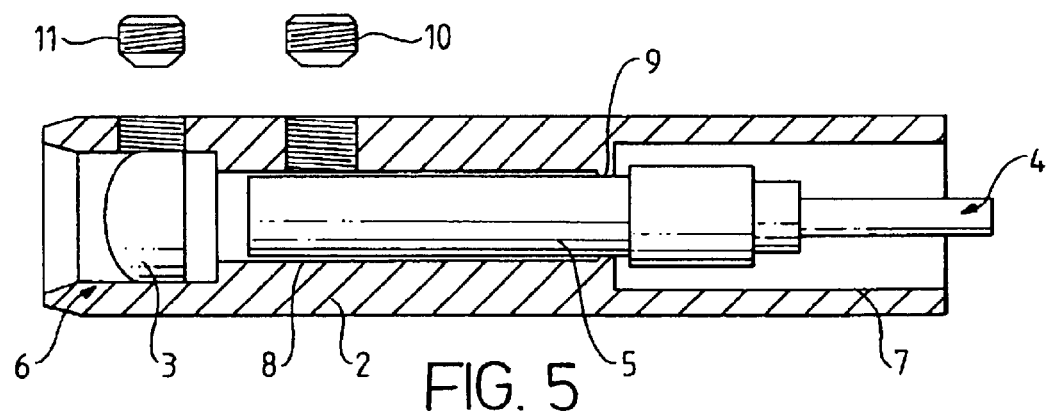

FIG. 5 shows a further embodiment in which a further set of adjustment means 11 are provided around the lens 3, for adjusting the position of the lens 3 in the holder 2. In this embodiment, therefore, both the lens and fibre can be adjusted in position in the holder 2.

The present invention in preferred embodiments at least can allow the manufacture of a more compact lens tube, which may be up to half the size of a conventional lens tube, whilst maintaining accurate alignment of the lens and optical fibre to provide an efficient optical component.

Although the present invention has been described with reference to a preferred embodiment, it will be understood by those skilled in the art that various changes in form and detail may be made without departing from the scope of the invention.

What is claimed is:

1. A method of constructing an optical component, the method comprising: providing a unitary holder having a throughbore, mounting a lens within the throughbore in a fixed relationship with respect to the holder, inserting an optical fibre into the throughbore, and adjusting the position of the optical fibre within the throughbore to align the optical fibre with respect to the lens; wherein the step of adjusting the position of the optical fibre within the throughbore comprises moving the fibre axially within the throughbore to adjust the axial distance between the lens and fibre end; and adjusting the relative tilt between the optical axis of the fibre and the optical axis of the lens.

2. The method of claim 1, comprising adjusting the radial alignment between the lens and fibre.

3. The method of claim 1, comprising adjusting the lateral alignment of the fibre with respect to the lens.

4. The method of claim 1, wherein the step of adjusting the position of the fibre comprises moving the fibre radially within the throughbore.

5. The method of claim 1, wherein the step of adjusting the relative tilt between the optical axis of the fibre and the optical axis of the lens comprises tilting the fibre about a pivot in the throughbore.

6. The method of claim 1, further comprising mounting the end of the optical fibre in a ferrule.

7. The method of claim 1, further comprising fixing the fibre in place such that no further adjustment is possible once the position of the fibre relative to the lens has been adjusted.

8. An optical component comprising a unitary holder having a throughbore, a lens mounted in the throughbore in a fixed relationship with respect to the holder, an optical fibre mounted in the throughbore, and one or more adjustors for adjusting the position of the optical fibre within the throughbore to align the optical fibre with respect to the lens; wherein:

the adjustor or adjustors comprise radially extending adjustors which are mounted on the holder and extend into the throughbore and can thereby move the fibre radially within the throughbore; and the holder further comprises:

a pivot about which the fibre can be tilted by the adjustor or adjustors in the form of a neck within the throughbore.

9. The optical component of claim 8, wherein the adjustor or adjustors are accessible from the exterior of the holder.

10. The optical component of claim 8, wherein the adjustor or adjustors are closer to the lens than the pivot.

11. The optical component of claim 8, wherein the pivot is closer to the lens than the adjustor or adjustors.

12. An optical component comprising:

a unitary holder having a throughbore, a lens mounted in the throughbore in a fixed relationship with respect to the holder, an optical fibre mounted in the throughbore, and two sets of longitudinally spaced adjustors for adjusting the position of the fibre in the throughbore to align the optical fibre with respect to the lens; wherein the adjustors comprise radially extending adjustors which are mounted on the holder and extend into the throughbore and can thereby move the fibre radially within the throughbore.

13. The optical component of claim 8, wherein the end of the optical fibre is mounted in a ferrule.

14. The optical component of claim 8, wherein the throughbore of the holder comprises a front portion formed at one end of the holder which receives the lens, a rear portion formed at the other end of the holder from which the optical fibre extends, and a centre portion between the front portion and the rear portion which receives the front end of the fibre.

15. The optical component of claim 14, wherein the adjustor or adjustors are located in the centre portion of the throughbore.

16. The optical component of claim 14, wherein the throughbore is formed with a pivot located between the rear portion and the centre portion of the throughbore.

17. A method of constructing an optical component, the method comprising:

providing a unitary holder having a throughbore, mounting a lens within the throughbore, inserting an optical fibre into the throughbore, and adjusting the position of the optical fibre within the throughbore to align the optical fibre with respect to the lens, wherein the step of adjusting the position of the optical fibre within the throughbore comprises moving the fibre axially within the throughbore to adjust the axial distance between the lens and fibre end; and adjusting the relative tilt between the optical axis of the fibre and the optical axis of the lens.

18. The method of claim 17, further comprising adjusting the position of the lens within the throughbore.

19. An optical component comprising:

a unitary holder having a throughbore, a lens mounted in the throughbore, an optical fibre mounted in the throughbore, and one or more adjustors for adjusting the position of the optical fibre within the throughbore to align the optical fibre with respect to the lens; wherein:

the adjustor or adjustors comprise radially extending adjustors which are mounted on the holder and extend into the throughbore and can thereby move the fibre radially within the throughbore; and the holder further comprises:

a pivot about which the fibre can be tilted by the adjustor or adjustors in the form of a neck within the throughbore.

20. The optical component of claim 19, further comprising one or more adjustors for adjusting the position of the lens within the throughbore.

21. An optical component comprising:

a unitary holder having a throughbore, a lens mounted in the throughbore, an optical fibre mounted in the throughbore, and two sets of longitudinally spaced adjustors for adjusting the position of the fibre in the throughbore to align the optical fibre with respect to the lens; wherein:

the adjustor or adjustors comprise radially extending adjustors which are mounted on the holder and extend into the throughbore and can thereby move the fibre radially within the throughbore.

22. The optical component of claim 21, further comprising one or more adjustors for adjusting the position of the lens within the throughbore.

23. The optical component of claim 12, wherein the adjustor or adjustors are mounted on the holder.

24. The optical component of claim 12, wherein the adjustor or adjustors are accessible from the exterior of the holder.

25. The optical component of claim 12, wherein the adjustor or adjustors are capable of moving the fibre radially within the throughbore.

26. The optical component of claim 12, wherein the end of the optical fibre is mounted in a ferrule.

27. The optical component of claim 12, wherein the throughbore of the holder comprises a front portion formed at one end of the holder which receives the lens, a rear portion formed at the other end of the holder from which the optical fibre extends, and a centre portion between the front portion and the rear portion which receives the front end of the fibre.

28. The optical component of claim 27, wherein the adjustor or adjustors are located in the centre portion of the throughbore.

29. The optical component of claim 27, wherein the throughbore is formed with a pivot located between the rear portion and the centre portion of the throughbore.

* * * * *